United States Patent

Stein

[15] 3,666,881
[45] May 30, 1972

[54] ELECTRO-OPTICAL DISPLAY DEVICE EMPLOYING LIQUID CRYSTALS

[72] Inventor: Richard J. Stein, 5 Elm Street, Great Neck, N.Y. 11021

[22] Filed: Dec. 28, 1970

[21] Appl. No.: 101,602

[52] U.S. Cl. ...................... 178/5.4 BD, 178/7.3 D, 250/199, 250/213 R, 350/160
[51] Int. Cl. ....................................... H04n 9/12, G02f 1/28
[58] Field of Search............. 178/5.4 R, 5.4 BD, 7.3 D, 7.5 D, 178/DIG. 8; 350/160 LC; 250/213 R, 199; 313/89, 91

[56] References Cited

OTHER PUBLICATIONS

IBM Technical Disclosure Bulletin Vol. 12 No. 10 March 1970 pp. 1697– 1698 " Liquid Crystal Display" by W. P. Hornberger
IBM Technical Disclosure Bulletin Vol. 12 No. 6 Nov. 1969 pp. 864– 865 " Liquid Crystal Image Intensifier and Recorder" B. Kazan
Applied Physics Letters Vol. 17 No. 2 July 15, 1970 pp. 51–53 " Reversible Ultraviolet Imaging with Liquid Crystals" J. D. Margerum et al.

Primary Examiner—Robert L. Richardson
Assistant Examiner—George G. Stellar
Attorney—Polachek & Saulsbury

[57] ABSTRACT

An electro-optical display system comprises a display screen including one or more juxtaposed sets of nematic liquid crystal and photoconductive layers bounded by transparent electrodes. The screen is scanned by scanning light while modulated bias voltages are applied across the liquid crystal and photoconductive layers. Images appearing on the screen are viewable by reflected ambient light to which the photoconductive layers are transparent. Colored dyes mixed with the nematic liquid crystals result in colored images on the screen. Cholesteric liquid crystal mixed with the nematic liquid crystal retains the images on the screen for predetermined periods of time. The images are viewable at either side of the screen. The screen can be internally illuminated.

12 Claims, 4 Drawing Figures

INVENTOR.
RICHARD J. STEIN

INVENTOR.
RICHARD J. STEIN

ELECTRO-OPTICAL DISPLAY DEVICE EMPLOYING LIQUID CRYSTALS

BACKGROUND OF THE INVENTION

1. Field of the Invention

This invention concerns an optical display device employing liquid crystalline materials and photoconductors, useful in monochrome and multiple color television, oscilloscopes, information handling and display, and the like.

2. Prior Art

It has long been recognized that the vacuum envelope, high voltages, magnetic field sensitivity, mask and color screen, high ambient illumination and restricted resolution are among the limitations retarding development of television and oscilloscope technology. It has also been understood that a substantially flat television display screen would be highly desirable but thus far no practical one has been proposed or developed.

STATEMENT OF THE INVENTION

The present invention is directed at a display device which overcomes the principal objections to conventional television and oscilloscope display systems by a compact array of components. A planar sandwich is employed including one or more cells of liquid crystal, photoconductor and transparent electrically conductive layers. The conventional vacuum envelope is eliminated along with the electron beam, magnetic field assembly, bulky construction, and other undesirable features of conventional visual display devices employing cathode ray tubes.

A three color display system embodying the invention employs a planar sandwich screen structure. A scanning light spot scans a raster on the screen structure. No other modulation of the position or intensity of the light spot is necessary. The screen sandwich includes three stacked sets of layers as above mentioned, to obtain a full color display. For a subtractive color output each liquid crystal layer includes a mixture of a nematic liquid crystal and a pleochroic dye. The liquid crystal has the property of dynamic light scattering in the presence of an applied electric field. The liquid crystal and dye mixture has the property of switching optical-state from color scattering to clear in the presence of an applied electric field, when a bias voltage is maintained across each color layer such that the associated photoconductor sustains sufficient voltage drop to keep the liquid crystal layer in a non-field oriented state, the scanning spot causes the initially colored liquid crystal-dye mixture to switch or change to a colorless state. The switching to a colorless state is observed as an enhancement of the complementary colors in a system where color information is subtractive. The color modulation signal from the receiver or other source is used to modulate the bias on each color layer. The net result is that under external polychromatic (white) ambient illumination a color display is seen. The display is reflective and consequently gets brighter as the ambient light is increased. The scanning light spot preferably consists of light outside of the absorption bands of the three color layers, but within the absorption or photoconduction band of the photoconductive layers, e.g. near ultraviolet or infra-red. For a one or two color display in oscilloscopes and the like the planar sandwich will include only one or two liquid crystal-photoconductor sets respectively.

The invention is adapted to an additive color display system by changing the liquid crystalline material to a cholesteric, a nematic or other electro-optical compound or mixture. In this case an internally illuminated display is possible, although it is also possible in the subtractive color display. For oscilloscope use variable persistence of image can be achieved by using a storage type liquid crystal mixtures. For television applications the time required to impart information by initiating the process of optical switching of the liquid crystal layers will not exceed 0.2 microseconds so that scanning rates employed in current television practice may be used.

It is therefore a principal object of the invention to provide an electro-optical display screen utilizing liquid crystalline material and a photoconductor or photoconductors, applicable for black and white and color television, oscilloscopes, information display equipment, etc.

A second object is to provide a display screen having low cost, simple construction, less bulk and safety hazard than conventional electro-optical display screens.

A third object is to provide a display screen requiring low power input while high visibility is still obtained, the display screen operating as an image intensifier, that is, as a reflective hence passive device.

A fourth object is to provide a display screen capable of being excited by images or scanning spots of electromagnetic radiation rather than electron beams, such radiation occupying selected portions of the electromagnetic spectrum.

A fifth object is to provide an opto-electronic screen which may be gated or modulated independently of the incident radiation, and thereby to allow superposition of modulation as the output of the display, for example in the selective enhancement or reduction of images or in their conversion.

A sixth object is to provide a display screen which can be incorporated into devices not presently practical because of the physical restraints put on current cathode ray tube design.

A seventh object is to provide a display screen comprising a liquid crystal cell having two or more electrically contiguous layers of photoconductive material and liquid crystalline material, means for containing these layers, and means for application of electrical fields to the layers.

Other and further features, objects and advantages of the invention will become apparent from the following detailed description taken together with the drawings, wherein:

DETAILED DESCRIPTION

Figures 2, 3:
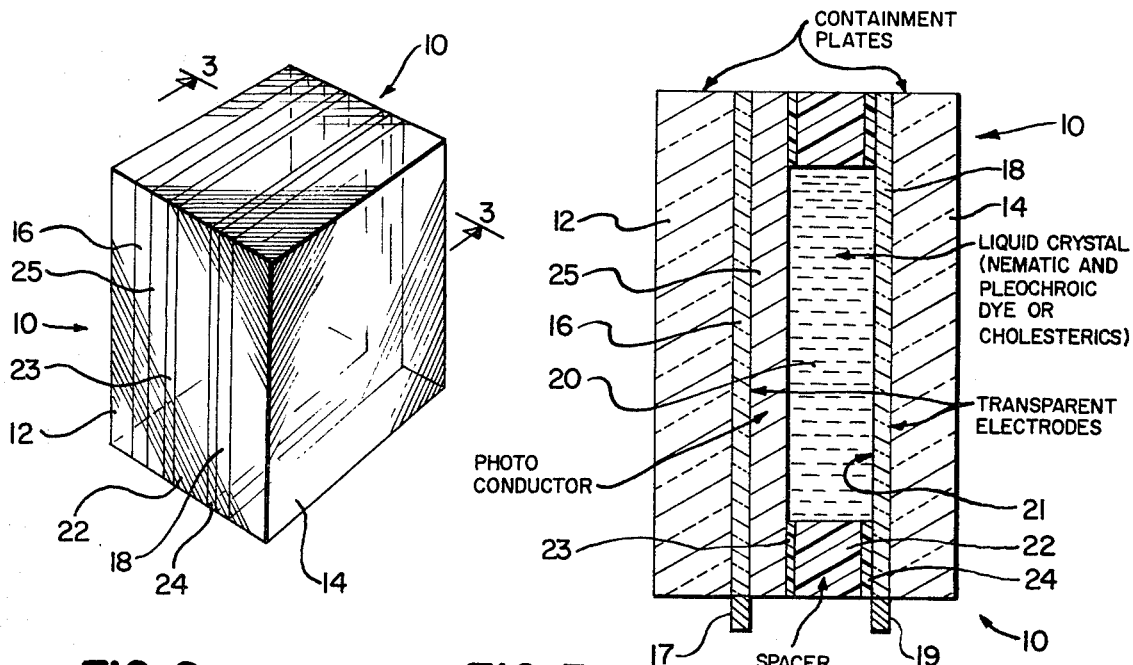
FIG. 2 is a perspective view of an electro-optical element employed in the system of FIG. 1.
FIG. 3 is an enlarged cross sectional view taken on line 3—3 of FIG. 2.

Referring first to FIGS. 2 and 3 there is shown a cell structure 10 which is generally similar to that described in my copending U.S. Patent application Ser. No. 101,603 entitled "Liquid Crystal Memory Device" being filed simultaneously. Cell 10 includes two outer flat transparent plates 12 and 14 made of glass or plastic to serve as containment members for the multilayered structure. The inner sides of plates 12 and 14 are coated with transparent conductive films 16 and 18 respectively made of tin oxide or the like. Tabs 17 and 19 may be provided as extensions of the conductive films for application of an electrical voltage to establish an electric field therebetween. One plate 12 is further covered with a photoconductive film 25. This may for example be vacuum deposited amorphous selenium. A ring-like spacer 22 made of a polymeric substance such as polytetrafluorethylene (Teflon) is interposed between the conductive film 18 and photoconductor 25 and sealed by plastic cement seals 23, 24 to define a chamber 21 having a depth on the order of one thousandth of an inch. This is filled with a liquid crystalline mixture 20. For simple monochrome image display, a nematic liquid crystal of the type that exhibits dynamic scattering on application of an electric field is used. Such liquid crystals are known in the art and are described in references such as U.S. Pat. No. 3,222,485 and G.W. Gray, Molecular Structure and the Properties of Liquid Crystals, Academic Press, New York, 1962. A suitable nematic liquid crystal may be the compound MBBA. This is normally transparent and liquid at ambient room temperatures. In order to increase visibility, pleochroic dyes having suitable dipole moments and chemical properties may be mixed with nematic crystals of types not exhibiting dynamic scattering. For certain applications where image storage is required, for example, mixture of nematic and cholesteric liquid crystals can be used.

A cell 10 having a planar configuration is shown in the drawings, however, it will be understood that this is only exemplary, The cell may be curved or have some other geometrical shape.

If a bias voltage is maintained across the liquid crystal and photoconductive layers 20, 25 via electrodes 16, 18 and if this voltage is insufficient to cause an optical change of state in the liquid crystal material while the photoconductive layer 25 is maintained in darkness, but is sufficient to switch the liquid crystalline material when the photoconductor is illuminated and therefore conductive, the primary effect necessary to operation of the device occurs. This effect is that the photoconductor acts as an optically activated gate to the bias electric field applied via the transparent electrodes 16, 18. Any modulation, either spatial in the plane of the photoconductor, or temporal, in the incoming signal illumination can be reproduced as a change in optical state in the liquid crystal. Any modulation in the applied bias voltage to the liquid crystal also gates the net effect, and thereby allows the entire cell to be temporarily modulated by electrical means.

Figure 1:
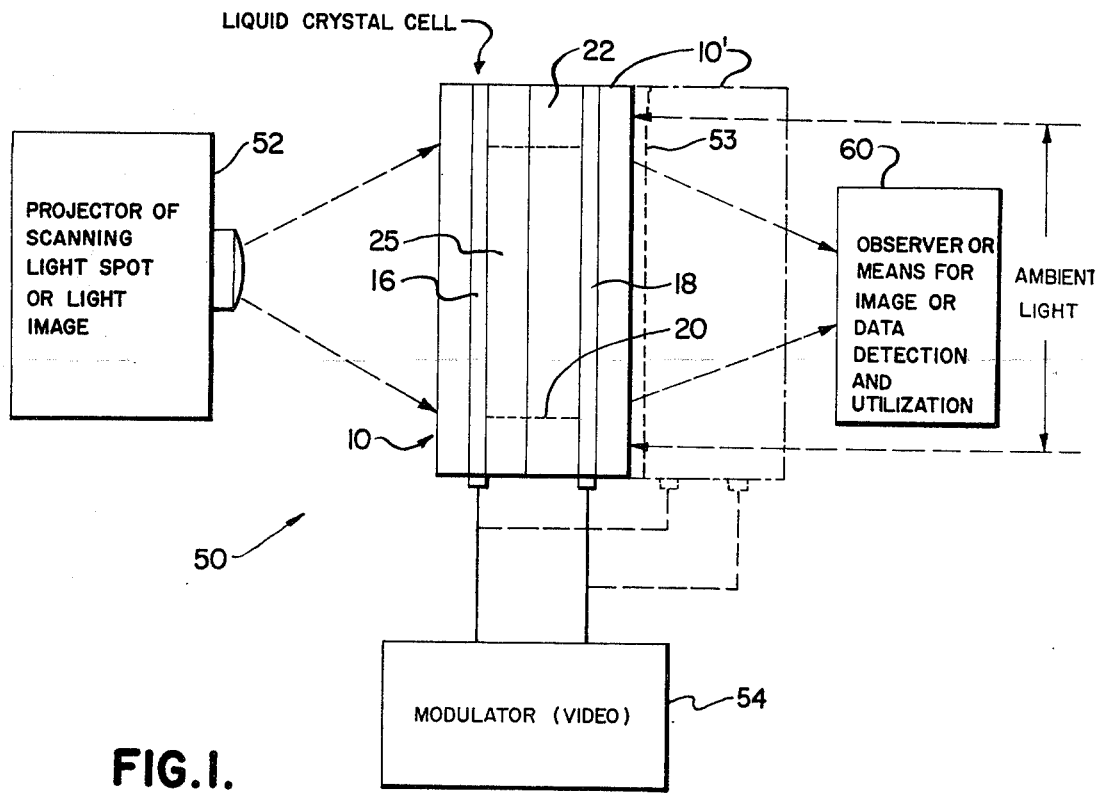
FIG. 1 is a diagrammatic representation of a display system embodying the invention, useful for black and white television or a single color oscilloscope.

Referring now to FIG. 1, there is shown a display system 50 useful for black and white television or monochrome oscilloscope applications. The display screen is a single cell 10 having one photoconductive layer 25 and one liquid crystal layer 20 enclosed by spacer 22. A scanning light spot which may be polarized emitted by projector or scanner 52 is used to scan a raster onto the plane of the photoconductor. This may be a raster of 525 interlaced lines as conventionally used in current television broadcast practice. The photoconductor 25 will be chosen so that the range of its photoresponse does not significantly overlay the desired range of light wavelengths which are to be viewed. This allows a reflective display which is not sensitive to ambient light. An optical filter 53 may be added to further restrict the possibility of the display being sensitive to ambient light.

The scanning spot need not be modulated with the video information, since it is possible to gate the bias on the photoconductor and liquid crystal with the video information. This will be done by video modulator 54 applying the modulated bias across the photoconductor and liquid crystal via transparent electrodes 16, 18. The image display appearing in the liquid crystal is viewed in reflected ambient light by image detection means 60 or by an observer at the liquid crystal side of cell 10. It is also possible to illuminate the cell 10 from within, or from the other side.

The scanner 52 required to scan a light spot in a raster or randomly, may be mechanical, for example rotating mirrors, or electro-optical, or involve a cathode ray tube flying spot scanner. The choice of liquid crystal used in cell 10 depends on requirements for contrast, color, available voltages and chemical compatibility with the chosen photoconductor. In the present embodiment, a nematic liquid crystal mixture with a small amount of pleochroic dye, or a nematic crystal exhibiting dynamic scattering will produce a display having high effective contrast at low drive or bias voltages, and will be viewable over a wide viewing angle.

When relatively slow scan rates are desired cholesteric liquid crystalline material such as cholesterol chloride or other color changing electro-optive may be used. This will make possible polychromatic display from a single layer since the liquid crystal will respond chromatically to varying applied bias voltages. This makes possible applications of system 50 to color densitometric-type of display. System 50 will serve for monocolor television display since the time for current injection which determines the inception of light scattering is short enough (not more than 0.2 microseconds) for television scanning. In oscilloscope applications, two or more cells 10 may be simultaneously scanned and decoded by modulating or gating the bias at each cell. When two cells 10, 10' are used they will be juxtaposed to each other. This will allow a two color display from the same light source. The additional cell 10' is indicated by dotted lines in FIG. 1.

Figure 4:
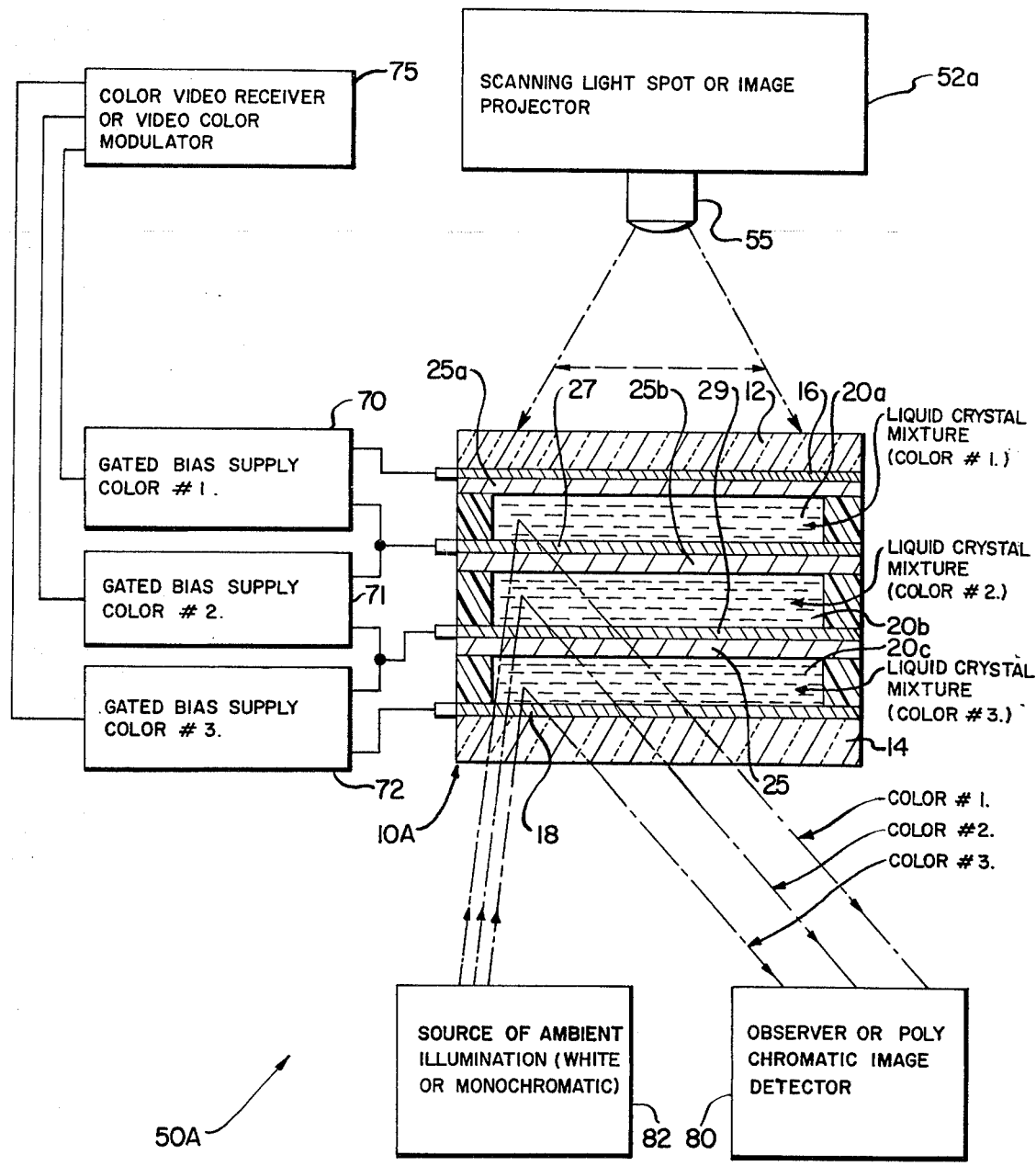
FIG. 4 is a diagram of a color television display system embodying the invention, and employing a multilayered liquid crystal structure, shown in cross section.

For full color television-type display, a somewhat more complex, but inherently more controllable system 50A may be employed as illustrated in FIG. 4 to which reference is now made. System 50A may be employed as a three-color, substraction-from-saturation television display. A multilayer liquid crystal cell structure 10A is employed. This is similar to cell 10 of FIGS. 1 and 2 and corresponding parts are identically numbered. The cell has three liquid crystal layers 20a, 20b and 20c with a photoconductor 25a, 25b, 25c juxtaposed to each crystal layer. Transparent conductive layer 16 is applied to transparent containment plate 12. Transparent conductive layer 18 is applied to transparent containment plate 14. Transparent conductive layers 27 is interposed between liquid crystal layer 20a and photoconductor 25b. Transparent conductive layer 29 is interposed between liquid crystal layer 20b and photoconductor 25c. Each crystal layer comprises a mixture of a nematic liquid crystal and a different pleochroic dye.

Scanning mechanism 52a projects a light beam or spot on the laminated structure and scans a television type of interlaced raster. Temporal modulation of the beam is not required. A blank or completely scanned raster is produced in the plane of the multilayered structure 10A. The beam should be of such divergence that its intersection with the plane of each of photoconductors 25a–25c is approximately of the same diameter. This means that the raster should be in focus over the depth of the display screen. This requirement can readily be met since the total thickness of each pair of photoconductor liquid crystal layers can be in the range of one to five thousandths of an inch. The wavelength of the scanning light beam is chosen as follows. The display is constructed so as to be viewable in multi-chromatic ambient light, for example daylight or indoor lighting. Therefore the photoconductive layers must not be responsive to such illumination. Photoconductors 25a–25c may be chosen having spectral responses for photoconductivity in the near infrared or near ultraviolet regions, and the wavelength of the scanning beam lies in the same range. Other wavelength components in the scanning beam are not necessary, but may be desirable if the device is to be viewed in the absence of external illumination. Scanner 52a can be a flying spot cathode ray scanner with fast phosphor, for example P15, and suitable faceplate to allow transmission of appropriate light wavelengths. A convex lens 55 can be employed to focus the scanned raster onto the display screen defined by the three photoconductors. The scanner 52a regardless of its construction or type will produce a raster scan whose effect is to produce photoconductivity in all three layers 25a–25c intersected by the light beam.

The liquid crystal layers comprise material whose color is a function of the applied electric field. For color television display purposes, a nematic liquid crystal mixed with a suitable pleochroic dye is used. This type of mixture will possess a distinct color in the absence of a certain level of electric field, and will become essentially colorless in the presence of a field above a threshold value. In the three-color subtractive display, the colors chosen will be primaries such as magenta, cyan and yellow arrange in such order and with such dye densities and/or liquid layer thicknesses so that when quiescent, all colors add to a neutral gray or black. The other components of the multilayered cell 10A, i.e., conducting electrodes 16, 18, 27 and 29, photoconductor layers 25a–25c, and support plates 12, 14 are substantially transparent in the visible light spectrum and hence do not color the screen.

Bias voltages are applied above a threshold magnitude which will depend on the composition and thickness of the liquid crystals and of the photoconductor layers. The bias voltages cause each liquid crystal to change its observable optical state from colored to transparent in those regions where illumination from the spot scanner 52a impinges on the photoconductor layer directly contiguous.

Each colored layer 20a, 20b and 20c is independently connected by gated bias supply sources 70, 71, 72 to three color signals derived by video receiver 75 from a color television broadcast. The three signals in the present system are respectively fed by the drive circuitry 70–72 to each entire color layer 20a–20c of the screen which is simultaneously scanned with a continuous (blank) raster pattern by the light source 52a. In those areas of each layer where the light beam and the color modulation or gating voltages are simultaneously available optical change in the liquid crystal layer is manifest by loss of the color of that particular layer. By employing a source of illumination and a photoconductor response which do not lie in the visible region represented by the combinations of colors available from the pleochroic dyes, and in choosing pleochroic dyes which have well defined scattering properties restricted to their visible colors, it is assured that the optical state of each layer does not influence the penetration of the scan through the colored layers.

To the observer 80 viewing the display by reflected ambient illumination 82, the effect of locally rendering a particular color layer transparent is to remove that particular color from the sum of three, and thereby the observer is presented with the complement of the color. Since the dynamic scattering effect is controllable with applied voltage, proportional color subtraction is possible, allowing full control over hue and intensity.

The principles of the invention can be applied to other applications such as image conversion, amplification, color image storage, color densitometry, X-ray imaging, and so on. For such other applications it should be recognized that the type of layered structure described is not limited to either a particular region of the electromagnetic spectrum for excitation or readout, or to a particular type of liquid crystal as the active medium. Additive color displays are possible by inverting the color modulating signal so that the display is transparent except when the drive renders it colored. The system is amenable to use of more or less than three crystal layers, and by addition of either a reflective or black background, contrast may be enhanced. The display may be illuminated by ambient illumination 82 at either side of cell 10A and can be viewed from either side. The display may be rendered visible by some other exciting light source than ambient illumination, such exciting light may be contained in the scanning light.

The multilayered cell may contain a layer or layers of mixed cholesteric and nematic crystals for use in storing a particular image for significant, predetermined periods of time, to permit examination, photographing, and the like. In addition the display may be read via pairs of conducting electrodes and a lower than threshhold bias voltage while it is being scanned by a light beam. The display may be excited by other images, either partial or complete, for example, by any optical image in the appropriate wavelength range. Since it may be read by a scanning light spot, the device can find application in television cameras for color or black or white operation.

To summarize, the invention has the following desirable characteristics:

1. Reflective display is insensitive to loss of high contrast in high ambient light level.
2. Increase in ambient light level serves to increase visibility.
3. Image conversion of image intensification is possible with relatively simple construction.
4. Resolution in color display is not limited by a mask, and therefore fixed scan rates are not necessary.
5. There is no critical sensitivity to magnetic fields.
6. The color screen assembly may be used in many environments where its small size and lack of high voltages give it advantages over present display devices.
7. The liquid crystal display screens can be used for projection television applications, and can be viewed from either side.
8. The display system has inherently low power consumption and requires no high voltages, high voltage transformers, electron guns, etc.
9. The display can be made to have variable persistence or storage, up to several weeks, for example, by addition of cholesteric liquid crystals to the nematic crystals in the liquid crystal layers.
10. The display system requires no evacuated envelope or tube to contain the display screen.

While a number of embodiments of the invention have been described, many modifications and variations are possible without departing from the invention.

What is claimed is:

1. An electro-optical display system comprising a display screen, said screen including a support, a liquid crystal layer contained by said support, a photoconductive layer juxtaposed to one side of said liquid crystal layer, a first transparent electrically conductive layer at the other side of said liquid crystal layer, and a second transparent electrically conductive layer juxtaposed to said photoconductive layer; means for scanning said screen by unmodulated scanning light including a wavelength to which said photoconductive layer is responsive; and means for applying modulated video signal bias voltages to the electrically conductive layers, so that images corresponding to the modulated video signal bias voltages are formed in the liquid crystal layer at points scanned by the scanning light.

2. An electro-optical display system as defined in claim 1, wherein said screen is exposed to exciting illumination, the wavelength at which the photoconductive layer is responsive lying outside the range of wavelengths of said exciting illumination, so that said images become detectable in the presence of the exciting illumination and are undetectable in the absence of said exciting illumination.

3. An electro-optical display system as defined in claim 2, wherein said photoconductive layer is transparent to said exciting illumination so that said images are viewable at either side of said screen.

4. An electro-optical display system as defined in claim 2, wherein said liquid crystal layer comprises a cholesteric liquid crystal compound mixed with a nematic liquid crystal compound so that said images are retained by the liquid crystal layer for predetermined periods of time.

5. An electro-optical display system as defined in claim 1, wherein said screen further comprises a second photoconductive layer juxtaposed to said first electrically conductive layer, a second nematic liquid crystal layer juxtaposed to said second photoconductive layer, and a third transparent electrically conductive layer juxtaposed to said second liquid crystal layer; and means for applying other modulated video signal bias voltages the first and third electrically conductive layers, both nematic liquid crystal layers containing respectively pleochroic dyes of different colors so that composite colored images corresponding to the bias voltages applied across the liquid crystal layers are formed in both liquid crystal layers at points scanned by the unmodulated scanning light.

6. An electro-optical display system as defined in claim 5, wherein both liquid crystal layers are exposed to ambient light, the wavelengths at which the photoconductive layers are responsive lying outside the range of wavelengths of said ambient light, so that the colored images become detectable in the presence of ambient light and are undetectable in the absence of ambient light.

7. An electro-optical display system as defined in claim 5, further comprising a cholesteric liquid crystal compound mixed with the nematic liquid crystal in at least one nematic liquid crystal layer so that the colored images are retained for predetermined periods of time.

8. An electro-optical display system as defined in claim 6, wherein said photoconductive layers are transparent to ambient light, so that the colored images are viewable at either side of said screen.

9. An electro-optical display system as defined in claim 1, wherein said screen further comprises a second photoconductive layer juxtaposed to said first electrically conductive layer, a second nematic liquid crystal layer juxtaposed to said second photoconductive layer, a third transparent electrically conductive layer juxtaposed to said second liquid crystal layer, a third photoconductive layer juxtaposed to the third electrically conductive layer, a third nematic liquid crystal layer juxtaposed to the third electrically conductive layer, and a fourth transparent electrically conductive layer juxtaposed to the third liquid crystal layer; and means for applying further modulated video signal bias voltages across the first and third electrically conductive layers and across the third and fourth electrically conductive layers, all of the three liquid layers containing pleochroic dyes different in color from each other, so that composite colored images corresponding to the bias voltages applied across the liquid crystal layers are formed in the liquid crystal layers at points scanned by the scanning light.

10. An electro-optical display system as defined in claim 9, wherein the screen is exposed to ambient light, the wavelengths at which the photoconductive layers are responsive lying outside the range of wavelengths of said ambient light, so that the colored images become detectable in the presence of the ambient light and are undetectable in the absence of ambient light.

11. An electro-optical display system as defined in claim 9, wherein the photoconductive layers are transparent to ambient light so that the colored images are viewable at either side of said screen.

12. An electro-optical display system as defined in claim 9, further comprising a cholesteric liquid crystal compound mixed with the nematic liquid crystal of at least one of the liquid crystal layers so that the colored images are retained for predetermined periods of time.

* * * * *